United States Patent [19]

Marie et al.

[11] Patent Number: 5,335,245
[45] Date of Patent: Aug. 2, 1994

[54] POWER LASER WITH UNCOATED DIAMOND WINDOW

[75] Inventors: Bruno Marie, Maurepas; Daniel Guerin, Chelles; Christian Larquet, Guyancourt, all of France

[73] Assignee: L'Air Liquide, Societe Anonyme Pour l'Etude et l'Exploitation des Procedes Georges Claude, Paris, France

[21] Appl. No.: 18,722

[22] Filed: Feb. 17, 1993

[30] Foreign Application Priority Data

Mar. 2, 1992 [FR] France ............... 92 02437

[51] Int. Cl.$^5$ ............................................. H01S 3/08
[52] U.S. Cl. ............................. 372/103; 372/55; 372/56; 372/34; 372/92
[58] Field of Search ................. 372/55, 56, 34, 92, 372/103

[56] References Cited

U.S. PATENT DOCUMENTS

| | | | |
|---|---|---|---|
| 3,895,313 | 7/1975 | Seitz | 372/103 |
| 4,536,442 | 8/1985 | Bovenkerk et al. | 428/323 |

FOREIGN PATENT DOCUMENTS

89/08856  9/1989  World Int. Prop. O. .

OTHER PUBLICATIONS

"Diamond as a High-Power-Laser Window", *Journal of the Optical Society of America,* vol. 64, No. 1, Jan. 1974, by D. H. Douglas-Hamilton et al., pp. 36–38.

"Performance Characteristics of Single Point Diamond Machined Metal Mirrors for Infrared Laser Applications", *Applied Optics,* vol. 13, No. 11, Nov. 1974, by T. T. Saito et al., pp. 2647–2650.

*Primary Examiner*—Georgia Y. Epps
*Attorney, Agent, or Firm*—Young & Thompson

[57] ABSTRACT

A power laser has a cavity (2) delimited at its opposite ends by a first partially transmitting window (3) and a second reflecting window (4). The first window (3) is constituted by at least one diamond wafer (5) with uncoated flat parallel surfaces, having a controlled thickness whose variations do not exceed 0.2 micron. The diamond wafer (5; 6) is mounted in an annular support (9; 10) of material which is a good heat conductor and is provided with a cooler (11; 12). The window (3) can comprise two parallel wafers ($5_A$, $5_B$) of diamond separated by a calibrated distance (14) which is an uneven multiple of $\lambda/4n$, $\lambda$ being the laser wavelength and n the index of refraction of the medium between the wafers. Or the second window (4) can also be constituted by a diamond wafer (6) with a reflective metallic coating (60). A sweeping gas can be blown over the internal surface of at least one of the windows.

8 Claims, 1 Drawing Sheet

POWER LASER WITH UNCOATED DIAMOND WINDOW

FIELD OF THE INVENTION

The present invention relates to power lasers comprising an optical cavity limited at its opposite ends by a first window, partially transmitting, and by a second, reflecting window.

BACKGROUND OF THE INVENTION

The windows (also called mirrors) constitute one of the weak points of power lasers. Thus, as soon as a particle deposits on them, it absorbs the radiation and retransmits it by conduction to the window. The local heating which results gives rise generally to the destruction of the window. It is thus considered that, under particularly careful conditions of cleanliness, 20-30 kW/cm$^2$ constitutes a limit value of the radiation flux permissible on existing windows. In the case of $CO_2$ lasers, in which the coefficient of reflection of the partially transmitting window is generally comprised between 50 and 90%, the transmitting windows are constituted by a substrate which is generally ZnSe, if desired AsGa, with multilayer coatings ensuring a high coefficient of transmission, the reflecting windows being generally constituted by a substrate of treated germanium or metallic mirrors, particularly of copper, with protective treatment.

OBJECT OF THE INVENTION

The present invention has for its object to provide structures for power laser windows, particularly $CO_2$ lasers, of simple and strong construction, offering a considerably increased lifetime, permitting high flexibility of determining the coefficients of reflection and/or of transmission and particularly adaptable to power laser beams of very small dimensions, such as waveguide lasers and in particular whispering gallery lasers which have high power densities for optics.

SUMMARY OF THE INVENTION

To this end, according to a characteristic of the invention, the first window is constituted by at least one diamond wafer with flat parallel uncoated surfaces having a controlled thickness, the variations of thickness not exceeding 0.2 micron.

According to a more particular characteristic of the invention, the diamond wafer is mounted in an annular support of material which is a good heat conductor, preferably associated with cooling means.

According to another characteristic of the invention, the window comprises two parallel diamond wafers separated by a calibrated distance, which is typically an uneven multiple of $\lambda/4n$, $\lambda$ being the wavelength of the laser and n the index of the medium between the two wafers.

BRIEF DESCRIPTION OF THE DRAWING

Other characteristics and advantages of the present invention will appear from the following description of embodiments, given by way of illustration but not limiting, with reference to the accompanying drawings, in which:

FIG. 2 is a cross-sectional view of a modification of a partially transmitting window according to the invention.

In the description which follows and in the drawing, the identical or analogous elements bear the same reference numerals, some indexed.

DETAILED DESCRIPTION OF THE INVENTION

Figure 1:
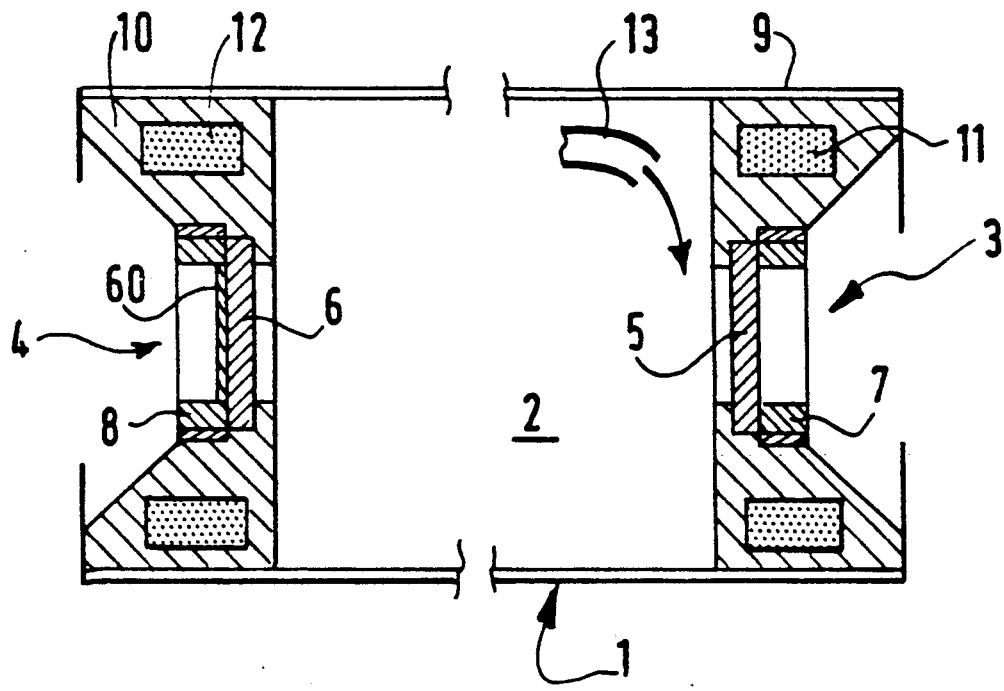

There is shown in FIG. 1 a $CO_2$ power laser 1 comprising an optical cavity 2 delimited at its opposite ends by a first partially transmitting window 3, and by a second reflecting window 4. The first window 3 and the second window 4 are each constituted by a diamond wafer with flat parallel surfaces 5, 6, respectively, of C-II-A diamond whose absorption at 10.6 microns (wavelength of the $CO_2$ laser) is very low (of the order of 0.03 cm$^{-1}$) and whose thermal conductivity is substantial (2,000 W/m/K) in comparison with those of copper (380 W/m/K) and ZnSe (18 W/m/K). Such a support is capable of avoiding local heating in the presence of dust: a particle of 10 microns subjected to a flux of 200 KW/cm$^2$ will give rise to a temperature rise of only 5° C. at the hottest point. The thickness of the wafers 5, 6 is greater than 150 microns and less than 1 mm.

According to one aspect of the invention, so as not to have to deposit multiple layers, the wafer 5 of the first window 3 has a carefully controlled thickness, the variations of thickness not exceeding 0.2 micron, so as to take advantage of the interference effect according to the interferometer principle of Fabry-Perot. Thus, with $\lambda$ equal to 10.6 microns, the reflection from one surface is of the order of 17% the reflection from the two surfaces being of the order of 34%. If the two surfaces are perfectly flat and parallel (thickness variations not exceeding 0.1 micron), the effective coefficient of transmission of the wafer will vary from 100%, if its thickness is a multiple of $\lambda/2n_i$, to 48.8% if the thickness is an uneven multiple of $\lambda/4n_i$, $\lambda$ being the laser wavelength and $n_i$ the index of refraction of the diamond of the wafer, in this case 2.37.

Experience has shown that, in the case of high coefficients of reflection, these latter are not very sensitive to the thickness of the wafer: with a maximum coefficient of reflection of 48.8%, an increase in the thickness of the wafer of 0.1 micron causes a drop of the coefficient to 48.4% while a variation of 0.2 micron in thickness of the wafer causes a drop of the coefficient to 47%. Experience shows on the other hand, in the case of a wafer 250 microns thick, that there would have to be a temperature increase of 100° C. to cause a change of 1% (relative) of the coefficient of reflection. According to one aspect of the invention, the coefficient of expansion of the diamond is for its part too small to have such an influence.

The wafer 6 of the second window 4 comprises a coating of a thin layer of gold 60, as described in the French application filed Mar. 2, 1992 by the applicant and having for its title "Power Laser with Coated Diamond Window".

To take advantage of the exceptional thermal conductivity of diamond, the wafers 5 and 6 are each mounted, for example by an axial locking ring 7, 8, or by brazing with preliminary deposit of a metallic layer on the periphery of the wafer, in an annular support 9, 10, respectively, of material which is a good heat conductor, for example of copper and comprising each a cooling means, for example a circuit 11, 12, respectively, for circulation of water or gas. For the applications under consideration, the diameter of the wafers 5, 6 does not exceed 7 min. The high resistance to abrasion of diamond permits installing a device 13 effecting, in the cavity 2, a sweeping of at least one of the windows by a flow of gas which will prevent the deposit of particles on the window without particular risk of having this window scratched by the particles which may be in suspension in the sweeping gas. This advantage is particularly useful in the case of lasers with rapid flux in which could then be used the flow of the lasing gas.

Figure 2:
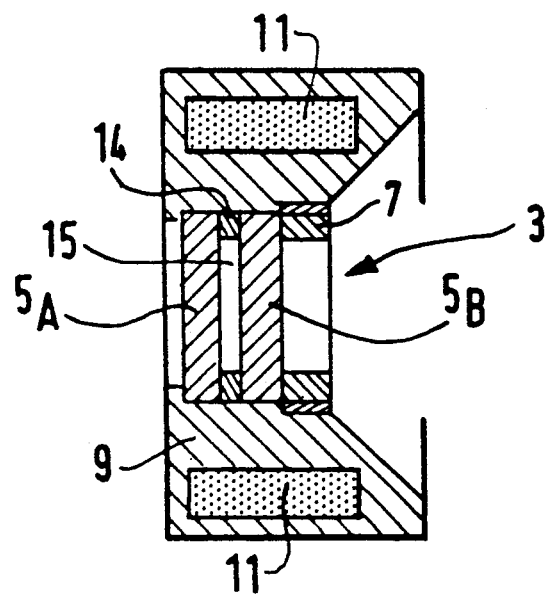
FIG. 2 is a schematic longitudinal cross-sectional view of a $CO_2$ power laser according to the invention.

In the embodiment of FIG. 1, the use of a single wafer 5 in the first window 3 does not permit exceeding a reflection of 49%. In the embodiment of FIG. 2, the window 3 comprises two calibrated diamond wafers $5_A$, $5_B$, each having a coefficient of reflection of about 48%, separated from each other, for example by a calibrated metallic ring 14 or an annular metallic deposit of controlled thickness providing between the wafers an intermediate layer 15, for example of air or a gas, having a thickness which is an uneven multiple of $\lambda/4n_i$, $n_i$ being the index of the intermediate medium 15. By adjusting the coefficients of reflection of each of the wafers $5_A$, $5_B$, and/or the thickness of the intermediate layer 15, there will be obtained a system whose coefficient of reflection can be from 0 to 88%. For example, with a wafer $5_A$ of a thickness 251 microns and a wafer $5_B$ of a thickness 240 microns separated by a space 15 of 602 microns, there will be obtained a coefficient of reflection of 80%.

An interesting property of the windows according to the invention is that they can thus perform the function of wavelength filters. Thus, the $CO_2$ lasers can emit at numerous wavelengths. For certain applications, particularly the measurement of pollution in the atmosphere, it might be desired to obtain the laser effect for only a single spectral line, in particular for a line which will not be the line P(20). At present, the selection of spectral lines is effected by using a grating and a partially transmissive mirror transmitting as a reflecting window 6. According to one aspect of the invention, by correctly choosing the thickness of the transmitting wafer 5, certain lines can be suppressed in favor of another. For example, by choosing the thickness of the transmitting wafer 5 such that it will be an uneven multiple of $\lambda/4n$ and an even multiple of $\lambda_2/4n$, the line $\lambda_2$ can be eliminated in favor of line $\lambda_1$. Thus, if it is desired to favor the line P(18), whose wavelength is 10.5716 microns, to the detriment of line P(20) whose wavelength is 10.5915 microns, there can be used a wafer having a thickness of 595.5 microns, whose coefficient of reflection will be 48.6% for the line P(18) and 0.02% for the line P(20).

Although the present invention has been described in regard to particular embodiments, it is not thereby limited but is on the contrary susceptible of modifications and variations which will be apparent to one skilled in the art.

What is claimed is:

1. A power laser comprising a cavity (2) delimited at respective opposite ends by a first partially transmitting window (3) and a second reflecting window (4), said first window (3) comprising at least one diamond wafer (5) with uncoated flat parallel surfaces, having a controlled thickness whose variations do not exceed 0.2 micron.

2. Laser according to claim 1, wherein the diamond wafer (5; 6) is mounted in an annular support (9; 10) of material which is a good heat conductor, and cooling means (11; 12) for the wafer (5; 6).

3. Laser according to claim 1, wherein the window (3) comprises two parallel wafers ($5_A$, $5_B$) of diamond separated by a calibrated distance (14).

4. Laser according to claim 3, wherein said calibrated distance (14) is an uneven multiple of $\lambda/4n$, $\lambda$ being the laser wavelength and n the index of refraction of the medium between the wafers.

5. Laser according to claim 1, wherein the second window (4) is also constituted by a diamond wafer (6) with a reflective metallic coating (60).

6. Laser according to claim 1, which is a gas laser, and which further comprises, in the cavity (2), means (13) for circulation of a sweeping gas over the internal surface of at least one of the windows.

7. Laser according to claim 1, which is a $CO_2$ laser, wherein the diamond of the wafers (5; 6) is C-II-A.

8. Laser according to claim 7, wherein the thickness of the wafers (5,6) does not exceed 0.5 mm.

* * * * *